United States Patent
Breuer et al.

(10) Patent No.: US 8,970,134 B2
(45) Date of Patent: Mar. 3, 2015

(54) SYSTEMS AND METHODS OF PREVENTING STROBING LIGHT OUTPUT

(71) Applicants: Christian Breuer, Newburyport, MA (US); Avinash Gunda, Danville, NH (US)

(72) Inventors: Christian Breuer, Newburyport, MA (US); Avinash Gunda, Danville, NH (US)

(73) Assignee: OSRAM SYLVANIA Inc., Danvers, MA (US)

( * ) Notice: Subject to any disclaimer, the term of this patent is extended or adjusted under 35 U.S.C. 154(b) by 22 days.

(21) Appl. No.: 13/794,500

(22) Filed: Mar. 11, 2013

(65) Prior Publication Data

US 2014/0252954 A1    Sep. 11, 2014

(51) Int. Cl.
*H05B 37/02* (2006.01)
*H05B 33/08* (2006.01)

(52) U.S. Cl.
CPC .................... *H05B 33/0893* (2013.01)
USPC .......................................... 315/308; 315/360

(58) Field of Classification Search
USPC ........................................ 315/291, 308, 360
See application file for complete search history.

(56) References Cited

U.S. PATENT DOCUMENTS

| 8,140,276 B2 * | 3/2012 | Walters et al. | 702/58 |
| 8,442,785 B2 * | 5/2013 | Walters et al. | 702/58 |
| 2014/0028211 A1 * | 1/2014 | Imam et al. | 315/200 R |

* cited by examiner

*Primary Examiner* — Thuy Vinh Tran
(74) *Attorney, Agent, or Firm* — Shaun P. Montana (57) ABSTRACT

Systems and methods for preventing or otherwise reducing cyclic light output caused by failure modes are disclosed, which shut off a power supply to a lighting system susceptible to output cycling (also known as flashing, flickering, or strobing) in a non-latching fashion. A power supply and/or driver system includes a processor and memory arrangement configured to track failures and prevent cyclical behavior when detected. The processor can be implemented, for example, with an existing microcontroller already present in the power supply, or as a dedicated processor. Once a failure mode that exhibits cyclic behavior above a certain frequency is detected, the power supply can be turned off or otherwise prevented from attempting to source power to the lighting system.

20 Claims, 5 Drawing Sheets

SYSTEMS AND METHODS OF PREVENTING STROBING LIGHT OUTPUT

CROSS-REFERENCE TO RELATED APPLICATION

The present application is related to U.S. patent application Ser. No. 13/794,527, filed Mar. 11, 2013 and entitled "SYSTEMS AND METHODS FOR POWER SUPPLY LOAD DETECTION WITH HOT-PLUG COMPATIBILITY", the entire contents of which are hereby incorporated by reference.

TECHNICAL FIELD

The present invention relates to lighting, and more specifically, to inhibiting cyclic light output in lighting systems.

BACKGROUND

Solid state light sources, such as but not limited to light emitting diodes (LEDs) and their related sources (e.g., organic LEDs (OLEDs), polymer LEDs (PLEDs), and the like) and the circuits that drive them (commonly referred to as drivers and/or driver circuits) are typically manufactured separately and electrically connected afterwards in a given lighting system. Simple and cheap drivers for series connection of solid state light sources are known that consist of a bridge rectifier and a filtering capacitor in parallel to the one or more solid state light sources, which are typically arranged in a string, as is well known in the art. Optionally, a linear resistance controller in series to the string of solid state light sources may be added. Powering light sources within a lighting system involves a number of non-trivial issues, particularly with respect to the driver component of the lighting system, such as meeting performance and safety standards.

SUMMARY

Conventional power supplies used to power solid state light sources, such as LEDs, are susceptible to a wide variety of hardware failures, or faults. These faults may be due to, for example, misuse, improper load or otherwise invalid configurations, faulty components, and/or extended operation in harsh environments, among others. Regardless of the root cause, a power supply specifically used to power one or more solid state light sources faces a unique liability when compared to power supplies for other light sources. In particular, an LED power supply must be able to fail without producing potentially dangerous lighting conditions such as strobing or cyclical output. To this end, a failed solid state light source power supply should not rapidly cycle its output power, as doing so could possibly endanger anyone at risk to epileptic seizures (photosensitive epilepsy) or other strobe-induced disorders (e.g., flicker-vertigo, etc). This requirement, however, is in direct conflict with the reality that a failed power supply may continue to attempt to power the attached light engine, depending on the nature of the failure mode, which may in turn cause an undesired cyclic lighting output. Power supplies with auto-recovery, restart, and/or hot-plug capability after faults are particularly vulnerable to such cycling.

Embodiments provide systems, methods, and techniques to prevent or otherwise reduce cyclic light output caused by system faults in power supplies for solid state light source-based light engines, and other such lighting systems susceptible to fail-mode-based strobing. Since some failure modes are non-latching and may cause the power supply to repetitively cycle its output (as the power supply continuously attempts to perform its assigned task of powering the light engine), some embodiments include tracking and/or predicting operating conditions. If a pattern of repetitive failures or other suspect failure mode is detected, then the cycling may be interrupted by preventing power delivery to the output of the power supply. Thus, a non-latching type failure mode that allows for power supply cycling is effectively converted to a latching type failure mode where the power supply is no longer allowed to cycle or otherwise output power to the light engine. As such, strobing is prevented.

In some embodiments, the cyclic detection and prevention techniques are programmed or otherwise configured into an existing microcontroller or other suitable processor of the power supply, power supply system, and/or driver circuit(s) for the light engine including one or more solid state light source(s). Once cyclic behavior is detected, the microcontroller then disables or otherwise interrupts the supply of power to the light engine. In some embodiments, a dedicated device is deployed either internally or externally to the power supply and is configured to detect and prevent undesired output cycling. In some embodiments, such a dedicated cyclic detection and prevention device is operatively coupled, for example, between the power supply and the load (e.g., the LED lighting array of the light engine). In some embodiments, such a dedicated device is configured, for example, to measure the power draw of the power supply and interrupts or otherwise cuts power when it detects cyclic behavior. As will be appreciated in light of this disclosure, embodiments provided herein may be further implemented in conjunction with other protection circuits for known potential failures.

As will be further appreciated in light of this disclosure, any rapid or otherwise undesired cycling may be due to a wide variety of faults, but embodiments provided herein are not reliant on detecting a specific fault condition. Rather, embodiments may be implemented to detect incorrect output conditions and/or failed startup attempts due to cycling input power, among other things, and to stop cyclic behavior above a certain frequency under any fault condition. In addition, embodiments have broad applicability and cover any single load and power supply fault, as well as many multiple faults scenarios. Embodiments may be used in conjunction with features like auto-recovery/restart-after-faults and load hot-plug capability, among others. Numerous other advantages of various embodiments will be apparent in light of this disclosure. For instance, one advantage of a power supply system configured in accordance with embodiments disclosed herein is that it may reduce the liability burden on the power supply designer and manufacturer for dangerous lighting conditions as a result of a fault within the power supply system. In some embodiments, note that the need to permanently disable a given power supply may be reduced, depending on the failure mode, such as in case the fault itself is temporary.

In an embodiment, there is provided a method. The method includes: upon start-up of a power supply, determining whether a non-volatile counter is greater than a threshold X, wherein the non-volatile counter tracks failed startup attempts of the power supply; and in response to determining that the non-volatile counter is greater than the threshold X: delaying application of the power supply to a light source load connected thereto for a delay N; in response to the power supply not shutting down prior to the delay N passing, resetting the non-volatile counter; and in response to the power supply shutting down prior to the delay N passing, preventing power from being applied to the light source load to inhibit strobing of the light source load.

In a related embodiment, in response to determining that the non-volatile counter is not greater than the threshold X, the method may further include determining whether the light source load is a valid load. In a further related embodiment, in response to determining that the non-volatile counter is not greater than the threshold X, the method may further include incrementing the non-volatile counter. In another further related embodiment, in response to determining that the light source load is a valid load, the method may further include delaying application of the power supply to the light source load for a delay M.

In a further related embodiment, in response to the power supply not shutting down prior to the delay M passing, the method may further include resetting a volatile counter, wherein the volatile counter tracks failed startup attempts of the power supply. In a further related embodiment, the method may further include incrementing the volatile counter for a detected load error. In a further related embodiment, in response to determining that the volatile counter is greater than a threshold Y, the method may further include at least one of: disabling an output regulator stage of the power supply from providing power to the load; and latching an input conversion stage of the power supply including galvanic isolation. In another further related embodiment, in response to determining that the volatile counter is not greater than a threshold Y, the method may further include waiting for the detected load error to pass.

In another embodiment, there is provided a non-transitory computer readable medium encoded with instructions that, when executed by one or more processors, cause a power supply to power a light source load, by performing operations of: upon start-up of the power supply, determining whether a non-volatile counter is greater than a threshold X, wherein the non-volatile counter tracks failed startup attempts of the power supply; and in response to determining that the non-volatile counter is greater than the threshold X: delaying application of the power supply to the light source load for a delay N; in response to the power supply not shutting down prior to the delay N passing, resetting the non-volatile counter; and in response to the power supply shutting down prior to the delay N passing, preventing power from being applied to the light source load.

In a related embodiment, in response to determining that the non-volatile counter is not greater than the threshold X, the processor may perform further operations of determining whether the light source load is a valid load. In a further related embodiment, in response to determining that the non-volatile counter is not greater than the threshold X, the processor may perform further operations of incrementing the non-volatile counter. In another further related embodiment, in response to determining that the load is a valid load, the processor may perform further operations of delaying application of the power supply to the light source load for a delay M. In a further related embodiment, in response to the power supply not shutting down prior to the delay M passing, the processor may perform further operations of resetting a volatile counter, wherein the volatile counter tracks failed startup attempts of the power supply. In a further related embodiment, the processor may perform further operations of incrementing the volatile counter for a detected load error. In a further related embodiment, in response to determining that the volatile counter is greater than a threshold Y, the processor may perform further operations of at least one of: disabling an output regulator stage of the power supply from providing power to the light source load; and latching an input conversion stage of the power supply including galvanic isolation. In another further related embodiment, in response to determining that the volatile counter is not greater than a threshold Y, the processor may perform further operations of waiting for the detected load error to pass.

In another embodiment, there is provided a system to power a light source load with a power supply. The system includes: an input conversion stage configured to convert a first voltage source to a second voltage source; an output regulator stage configured to receive the second voltage source and to provide a power source to drive the light source load; and a controller having a processor and a memory with instructions encoded thereon that, when executed by the processor, cause the system to: upon start-up of the power supply, determine whether a non-volatile counter is greater than a threshold X, wherein the non-volatile counter tracks failed startup attempts of the power supply; and in response to the determining that the non-volatile counter is greater than the threshold X: delay application of the power supply to the light source load for a delay N; in response to the power supply not shutting down prior to the delay N passing, reset the non-volatile counter; and in response to the power supply shutting down prior to the delay N passing, prevent power from being applied to the light source load to inhibit strobing.

In a related embodiment, in response to determining that the non-volatile counter is not greater than the threshold X, the system may be further configured to determine whether the light source load is a valid load and to increment the non-volatile counter; in response to determining that the light source load is a valid load, the system may be further configured to delay application of the power supply to the light source load for a delay M; and in response to the power supply not shutting down prior to the delay M passing, the system may be further configured to reset a volatile counter, wherein the volatile counter tracks failed startup attempts of the power supply. In a further related embodiment, the system may be further configured to increment the volatile counter for a detected load error; and in response to determining that the volatile counter is greater than a threshold Y, the system may be further configured to at least one of: disable the output regulator stage of the power supply from providing power to the light source load; and latch the input conversion stage of the power supply including galvanic isolation. In a further related embodiment, in response to determining that the volatile counter is not greater than a threshold Y, the system may be further configured to wait for the detected load error to pass.

BRIEF DESCRIPTION OF THE DRAWINGS

The foregoing and other objects, features and advantages disclosed herein will be apparent from the following description of particular embodiments disclosed herein, as illustrated in the accompanying drawings in which like reference characters refer to the same parts throughout the different views. The drawings are not necessarily to scale, emphasis instead being placed upon illustrating the principles disclosed herein.

DETAILED DESCRIPTION

Embodiments described herein provide for preventing or otherwise reducing cyclic light output caused by failure modes which shut off a power supply to a lighting system in a non-latching fashion. This is particularly useful in solid state light source-based lighting systems, which are susceptible to output cycling (sometimes referred to as flashing, flickering, or strobing). In some embodiments, a power supply or driver system includes a processor and memory arrangement configured to track failures and prevent cyclical behavior when detected. The processor may be, and in some embodiments is, a microcontroller already within the power supply and/or a dedicated processor. Once a failure mode that exhibits cyclic behavior above a certain frequency is detected, the power supply is turned off or otherwise prevented from attempting to source power to the light engine.

System Architecture

Figure 1:
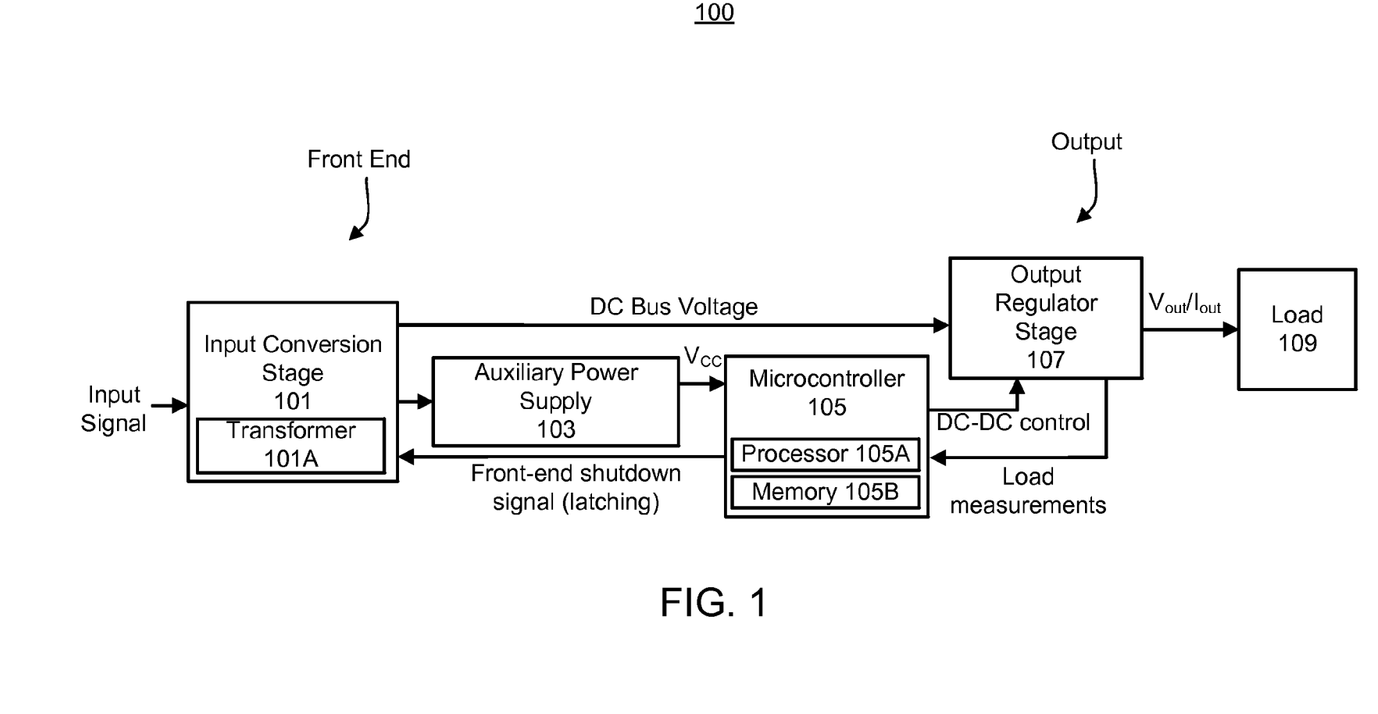
FIG. 1 shows a block diagram of a power supply system according to embodiments disclosed herein.

FIG. 1 illustrates a block diagram of a power supply system 100. The power supply system includes a front end and an output. The front end includes an input conversion stage 101 that receives an input signal, while the output includes an output regulator stage 107 configured to source voltage/current to a load 109. In some embodiments, the input conversion stage 101 receives an AC input signal, and thus the input conversion stage 101 is referred to as an AC-DC conversion stage. In some embodiments, the input conversion stage 101 receives a DC input signal, and thus the input conversion stage 101 is referred to as a DC-DC conversion stage. Embodiments are described herein in relation to the input signal being an AC input signal, but of course the invention is not so limited. The input conversion stage 101 generates a DC bus voltage that is provided to the output regulator stage 107. Thus, in some embodiments, the output regulator stage 107 is referred to as a DC-DC output regulator stage, as it receives the DC bus voltage as an input and outputs a DC signal (i.e., $V_{out}$ and/or $I_{out}$) to the load 109. In some embodiments, the load 109 is a light source that may be susceptible to strobing, such as a but not limited to one or more solid state light sources. The power supply system 100 also includes an auxiliary power supply 103. The auxiliary power supply 103 derives an auxiliary power supply voltage $V_{cc}$ from a DC output of the input conversion stage 101. The auxiliary power supply voltage $V_{cc}$ from the auxiliary power supply 103 is used to power a microcontroller 105. The microcontroller 105 includes a processor 105A and a memory 105B. A set of embedded routines is stored within the memory 105B. The microcontroller 105 is configured to control the output regulator stage 107 and to measure various parameters associated with the load 109. In addition, the microcontroller 105, in some embodiments, is further configured to control the input conversion stage 101 of the front end, and more specifically, to shut down or otherwise disable the input conversion stage 101, as is described in greater detail throughout.

The topology of the power supply system 100 may vary from one embodiment to the next, and may include any number of configurations such a fly-back converter, a buck converter, boost converter, buck-boost converter, push-pull converter, or other such topologies having an output regulator stage that may be controlled separately from an input conversion stage. Each of the depicted components may be implemented with conventional or custom technology. However, in addition to running any such typical or proprietary routines, the microcontroller 105 or equivalent device may be further configured to carry out one or more routines to inhibit or otherwise reduce cyclic light output caused by any number of failure modes. In some embodiments, this rapid strobing inhibiter functionality is implemented outside of the microcontroller 105, such as in a dedicated controller or circuit or other device that is specifically configured and deployed to carry out the variously disclosed techniques. To this end, embodiments may include additional or fewer components than are shown in FIG. 1, and the invention is not intended to be limited to any specific power supply configuration or topology.

In some embodiments that include an external AC line input such as the one shown in FIG. 1, the front-end AC-DC input conversion 101 includes a transformer 101A for providing galvanic isolation for the components of the power supply 100. In some embodiments, the transformer 101A is connected to or otherwise a part of a power factor correction (PFC) circuit (not shown in FIG. 1). The PFC circuit may be, and in some embodiments is, a part of, for example but not limited to, one or more power converters that include the transformer 101A and secondary-side power circuitry, as is generally known in the art. The power circuitry on the secondary-side of the transformer may, and in some embodiments does, include, for example but not limited to, a rectifier stage and energy storage, such as but not limited to a bulk or intermediate-bus capacitor, as is typically known in the art. In any such input conversion stage configurations, an external source voltage is converted to some desired DC source voltage that is suitable for a given application.

In some embodiments, the auxiliary power supply 103 of FIG. 1 is connected to the secondary-side power circuitry of the front end, but in other embodiments it may be included in the secondary-side power circuitry, if so desired. For example, in some embodiments, the auxiliary power supply 103 is implemented with a linear voltage regulator, though any other suitable circuitry configured to derive a desired auxiliary supply voltage from the front-end secondary-side voltage may be used. In some embodiments, the auxiliary power supply 103 may be implemented with a dedicated power supply. In some embodiments, the auxiliary power supply 103 may also include, for example but not limited to, a voltage divider (for setting the level of the auxiliary voltage applied to the microcontroller 105) and a low-pass filter (to eliminate high-frequency components of an AC input signal or any unwanted switching spikes that may result from a dimmer switch or signal conditioning elements).

As previously explained, the microcontroller 105 is used to control the power supply system 100, with respect to normal operations such as but not limited to dimming control. In some embodiments, the microcontroller 105 may include a pre-established lighting control schedule (e.g., provide 80% power during the day, and transition to 25% power during the evening hours) from which an appropriate dimming signal is generated and provided to the output regulator stage 107. In addition to such lighting controls, the microcontroller 105 may be, and in some embodiments is, further programmed or otherwise configured to execute a procedure for inhibiting or otherwise reducing cyclic light output caused by any number of failure modes. The details of this procedure will be discussed further with reference to FIGS. 2-4B. Briefly, depending on the nature of the failure mode detected, the microcontroller 105 may disable the output regulator stage 107 and allow the input conversion stage 101 to continue to operate, or may disable both the output regulator stage 107 and the input conversion stage 101, or may disable just the input conversion stage 101. To this end, the microcontroller 105 is configured to make various load measurements to assess or otherwise detect the presence of a given failure mode, and to issue control signals to the output regulator stage 107 as well as shutdown/latch signals to the front end (i.e., to the input conversion stage 101 and/or other components of the front end).

With respect to dimming control, in some embodiments, the output of the microcontroller 105 is a digital output signal (e.g., output of pulse width modulation module), while in some embodiments, the output is an analog output signal (e.g., DAC output or PWM output with low-pass filtering), while sin some embodiments, the output is a combination of both. Whatever the format, in some embodiments, the output is used to set a reference signal for the output regulator stage 107 and therefore to establish a current amplitude (analog dimming) or average current (PWM dimming) that is presented to the load 109 when it is a light source load. The choice between using analog dimming and PWM dimming depends on a variety of factors, such as but not limited to the application, design constraints, cost, and so on, that are considered during design of the power supply system 100. For example, in the case of the light source load being one or more solid state light sources, PWM dimming utilizing a PWM frequency above 200 Hz is usually preferred over analog dimming. The PWM dimming allows a higher dimming range, and due to its high frequency (typically more than 200 Hz), it is generally ensured that a strobing-free (sometimes also referred to as flicker-free) light from the solid state light source(s) is generated (during normal operation, not to be confused with fault-based flickering).

The output regulator stage 107 may be, and in some embodiments is, implemented as a DC-DC V-I converter, such as but not limited to a buck converter, where it is fed by a voltage source and its output appears to the load 109 as a current source (hence, a V-I converter). However, in some embodiments, other suitable converters and/or linear regulators may be used. As seen in FIG. 1, the load 109 may be driven by a voltage source or a current source, depending on the configuration of the output regulator stage 107. In some embodiments, note that any dimming circuitry, including the microcontroller 105, as well as the output regulator stage 107, may be implemented on a single chip or chip set that may be operatively coupled with the secondary-side of the transformer 101A. The PFC circuitry (not shown) may also be integrated on a chip or chip set. As will be appreciated, the degree of integration with respect to the various elements of the power supply circuitry will vary between embodiments. Some embodiments may be implemented with discrete components populated, for example, on a printed or wired circuit board. Further note that the microcontroller may already exist in a given power supply system design, and may then be further programmed or otherwise configured to carry out the techniques provided herein, including those to reduce cyclic light output.

Microcontroller or Dedicated Circuitry

Figure 2:
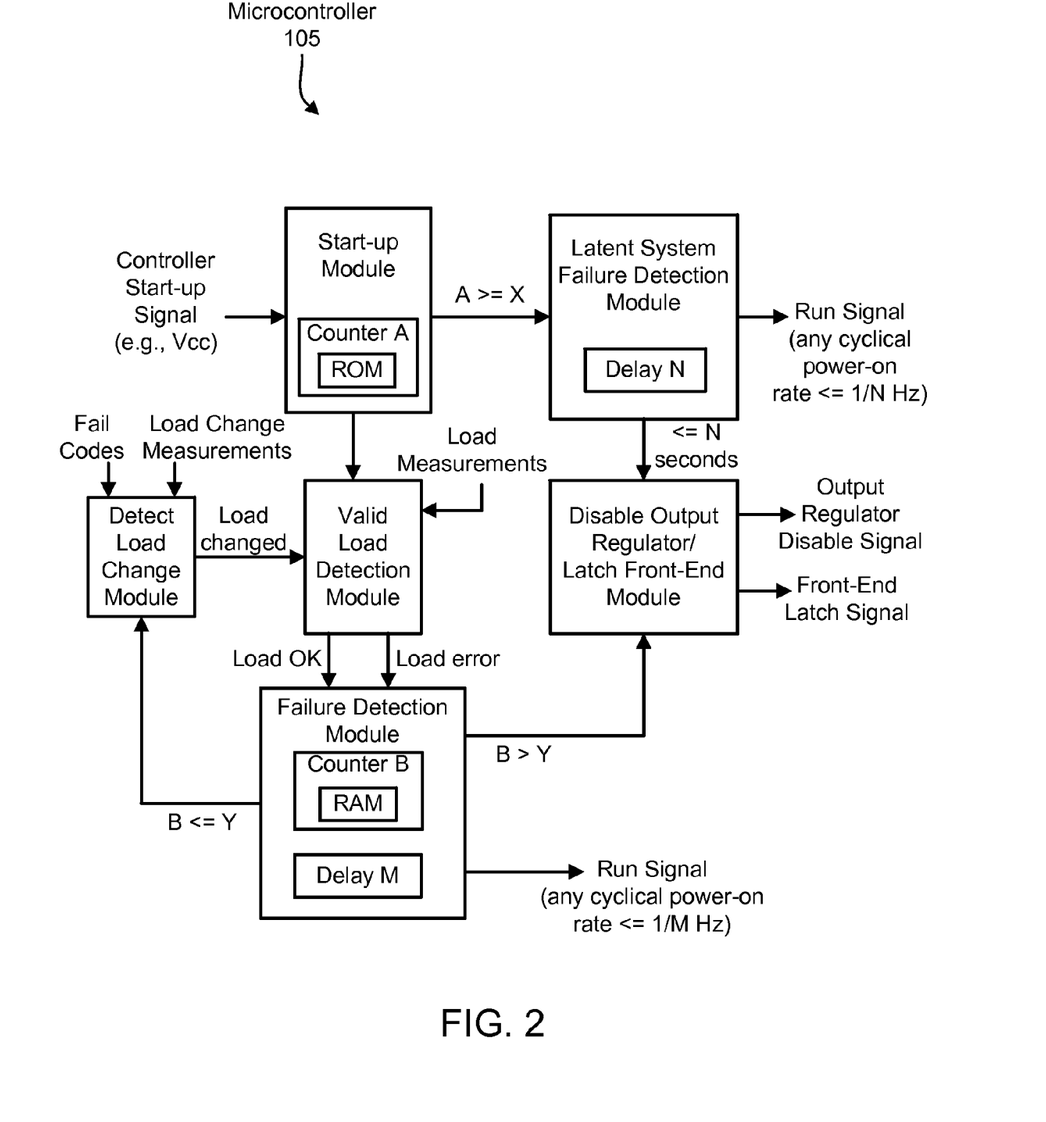
FIG. 2 illustrates a block diagram of a microcontroller of the power supply system shown in FIG. 1 according to embodiments disclosed herein.

FIG. 2 illustrates a block diagram of the microcontroller 105 of the power supply system 100 shown in FIG. 1. As previously explained, the functionality depicted may also be implemented in a dedicated module outside the microcontroller 105, that is either internal or external to the power supply system 100 of FIG. 1. Likewise, although a specific number of discrete modules are shown, some embodiments employ a different degree of integration, such as the case where some or all of the functional modules are integrated into one module, or the case where a given functional module is implemented with two or more distinct modules instead of one module. Numerous such variations and configurations will be apparent in light of this disclosure, so as to realize the functionalities provided herein.

The microcontroller 105 includes a Start-up Module configured to receive controller start-up signals (e.g., $V_{cc}$) and to maintain a non-volatile Counter A, a Latent System Failure Detection Module, a Valid Load Detection Module, a Failure Detection Module configured to receive load assessment signals and to maintain a volatile Counter B, a Detect Load Change Module, and a Disable Output Regulator/Latch Front-End Module. In general, any failure modes that occur within the time delays specified by Delay N and Delay M will not allow the corresponding Counters A and B to be reset and will therefore not allow the power supply system 100 to apply power to the load 109. For failure modes that occur after the time delays specified by Delay N and Delay M, the Counters A and B are reset, thereby allowing the power supply system 100 to cycle power to the load 109, but at a frequency determined by the value of delays associated with M and N. For instance, if M and N each equal 3 seconds, then any repetitive cycling of the power supply system 100 will have a frequency of ⅓ Hz or slower.

The microcontroller 105 uses two counters, Counter A and Counter B. The value of Counter A is stored in a non-volatile memory (e.g., read only memory, such as an EEPROM or other suitable non-volatile memory), and the value of Counter B is stored in a volatile memory (e.g., random access memory, such as an SDRAM or other suitable volatile memory). These two counters allow for protection against two general types of potential failures, including failures that allow the front end to continue functioning, and failures that do not allow the front end to continue functioning. Failures that allow the front end to continue functioning (and therefore provide power to the microcontroller 105 and its various memories) are tracked using volatile memory, because the active failure count registered in the volatile memory will not be lost when the failure mode occurs. On the other hand, failures that do not allow the front end to continue functioning, which stops power to the microcontroller 105 and its various memories, must be tracked using non-volatile memory, so the active failure count will not be lost when the failure mode occurs. Some embodiments exclusively use one or more non-volatile counters, however, non-volatile memory may be limited with respect to the number of write cycles that may be made in a given period of time, and accessing non-volatile memory by the microcontroller 105 may be more time consuming.

For failures that effect only the ability of the power supply system 100 to provide stable output power, and thus leave the front end functioning, an internal RAM-based monitoring system is used. In FIG. 2, this RAM-based monitoring system is implemented by the collective operation of the Valid Load Detection Module, the Failure Detection Module, and the Detect Load Change Module. In operation, this RAM-based monitoring system works by tracking the quantity and frequency of invalid output conditions, based on load measurements made by the Valid Load Detection Module. These load measurements may include, but are not limited to, output voltage and/or current readings taken from the output regulator stage 107. Each time the output voltage and/or current reading are outside of a valid operating range, the Valid Load Detection Module issues a load error signal and the output of the power supply system 100 to the load 109 may be disabled. This load error event is recorded by the Failure Detection Module using the Counter B, where the Counter B is incremented for each failure, and control is then passed to the Detect Load Change Module, which is configured to wait for the detected output conditions to change before re-attempting to operate. In some embodiments, the Detect Load Change Module is programmed or otherwise configured to monitor the voltage on a filter capacitor of the output regulator stage 107 to determine if a change has occurred. If no load change has occurred, the voltage on the capacitor will not have changed significantly either. In a more general sense, the Detect Load Change Module is configured to detect conditions indicative of a load change. For example, in some embodiments the Detect Load Change Module is configured to detect a rapid positive slope on the return voltage line and when the return voltage settles at a voltage less than the bus voltage. These two conditions are indicative that a new load 109 has been connected to the power supply system 100 and may also indicate whether the new load 109 is not an improper resistive or otherwise short circuit. Other such measurements to detect load changes will be apparent. The Detect Load Changed Module may, in some embodiments does, also use fail codes (e.g., providing by existing power supply components/modules) in assessing whether a load has been changed. In any case, if the Detect Load Change Module detects that the load 109 has changed, then the Detect Load Change Module may release the hold and issue a load changed signal to the Valid Load Detection Module. The load monitoring process may repeat until the Counter B indicates the failure threshold has been exceeded (e.g., B>10). The Disable Output Regulator/Latch Front-End Module may, and in some embodiments does, then issue a disable signal to the output regulator stage 107. If the system detects that it is unable to disable the output of the output regulator stage 107, and thus of the power supply system 100, then the Disable Output Regulator/Latch Front-End Module is further configured to disable the system power input, if the particular power supply system 100 is equipped with such capabilities. As will be appreciated, this RAM-based monitoring system works to prevent cycling output power due to faulty loads or output electronics.

To prevent against faults which cause the entire power supply system 100, including the microcontroller 105, to repeatedly lose power, such a volatile count-based method is supplemented by a non-volatile count-based method. As soon as the microcontroller 105 loses power, any information about repeated failures (including any stored in the volatile Counter B) would be lost, and thus a volatile count-based method alone as described above is not sufficient. To combat this issue, non-volatile memory (e.g., EEPROM, or other suitable non-volatile memory) of the microcontroller 105 stores the Counter A. The non-volatile count-based method employs the Start-up Module and its non-volatile Counter A to track the number of times the power supply system 100 is started, based on a received controller start-up signal, such as but not limited to $V_{cc}$. After the power supply system 100 has been running for a suitable amount of time based on the Delay N (e.g., a few seconds, to affirmatively prevent rapid cycling), this count of start-up attempts is set to 0 by the Latent System Failure Detection Module. If the number of failed starts tracked in the non-volatile Counter A is ever over a predefined threshold, and the power supply system 100 fails within the time of the Delay N, then the Disable Output Regulator/Latch Front-End Module will issue a latch signal to the front end and the power supply system 100 will cease to operate until input power is cycled. In some embodiments, if the power is maintained during the latched state, the Counter B tracker may be reset in order to avoid permanently disabling the power supply system 100. Rapid flashing due to cycling power output is avoided. Since any recurring startups that happen fast enough to have negative safety effects will be detected and tracked and inhibited, any flashing light output is limited to a safe rate (e.g., less than ⅓ Hz).

Thus, the microcontroller 105 disables the output regulator stage 107 after unsuccessful attempts (as indicated by the Counter B) at operating the load 109 that do not cause the microcontroller 105 to reset. "Unsuccessful" generally means that the load 109 is not within the specified load range (with respect to, for example, power, voltage, and/or current) shortly after powering it up. In addition, the microcontroller 105 records the number of power supply startup attempts in non-volatile memory (as indicated by the Counter A). After the number exceeds a limit (e.g., X>=10), the power supply system 100 latches with the output regulator stage 107 disabled. The startup count Counter A is then reset over time, so the power supply system 100 is not permanently disabled, but rather, rapid cycling is interrupted. In embodiments where the microcontroller 105 has lost control over the output regulator stage 107, and the front end continues cycling due the one or more fault conditions, the front end is equipped with a latch switch that may be enabled by the Disable Output Regulator/Latch Front-End Module of the microcontroller 105 to disable the front end from powering up. In a more general sense, the microcontroller 105 may be, and in some embodiments is, configured with the ability to shut the primary side of the front end down to a latching off state using any number of suitable techniques, as will be appreciated in light of this disclosure.

Embodiments enable the power supply system 100 to address numerous failure modes. For example, consider the following fault scenarios. With respect to variables shown in FIG. 2, in considering these scenarios, the following assumptions should be made: Delays N and M=3 seconds; Counter A threshold X=10; and Counter B threshold X=10.

Fault on the Front End:
The front end (i.e., the input conversion stage 101 and any related circuits) shuts down each time there is power draw from the secondary side. The output regulator stage 107 works with no error.

Behavior:
The output regulator stage 107 is not started the 11th time and the power supply system 100 is halted, resulting in no visible light output from the light source load 109.

Fault on the Front End:
The front end always shuts down ~1 s after start-up, regardless of whether the output regulator stage 107 is turned on or not. The output regulator 107 stage works with no error.

Behavior
The unsuccessful attempt Counter A will not be reset. The output regulator stage 107 will not be turned on from the 11th time on. There is no visible light output from the light source load 109.

Fault on Secondary Side:
The output regulator stage 107 cannot be controlled. The light source load 109 sees current/voltage whenever the front end delivers power. The front end works with no error.

Behavior
The front end will be shutdown via latching after the 11th startup. There is no visible output from the light source load 109.

Faulty Load:
Power, voltage, or current are out of range. The power supply system 100 works with no error.

Behavior:
The output of the power supply system 100 will not be activated after the 11th attempt. There is no visible light output from the light source load 109.

Failure modes where the fault occurs/exhibits effects after the consideration time set by the Delays N and M (e.g., 3 seconds) are not prevented. "Consideration time" is the time after a power up is considered successful. However, in such embodiments, note that the cycle frequency is limited (e.g., if the Delays M and N equal 3 seconds, the worst case cycle frequency is ⅓ Hz or slower). Of course, the numeric parameters for the number of startup attempts (variables X and Y in FIG. 2) and time when a start is considered successful (variables M and N in FIG. 2) may be adjusted to the application. In some embodiments, a failure rate may be tracked and used rather than an absolute failure count. In some embodiments, the number of failures per a given time period are computed as a rolling average. If the computed average exceeds the given threshold, appropriate action is taken as provided herein. This allows the power supply system 100 to distinguish between hard failure rates and soft failure rates.

Each of the functional modules shown in FIG. 2 may be, and in some embodiments are, implemented as one or more executable routines using any suitable programming language (e.g., C, C++, object-oriented C, proprietary instruction sets, etc), and encoded on one or more non-transient machine readable mediums, that when executed by one or more processors, carry out the functionalities described herein. The processor(s) may be, and in some embodiments are, the processor 105A within the microcontroller 105 as shown in FIG. 1 or any other suitable processor within a power supply or driver circuit, and the routines may be firmware embedded or otherwise stored within a memory 105B of the microcontroller 105 as shown in FIG. 1. Other suitable processing environments may be used as well, such as any computing device having sufficient memory and processing capability to execute the functional modules and capable of being operatively coupled to the power supply system 100. Some embodiments are implemented with gate-level logic or an application-specific integrated circuit (ASIC) or chip set or other such purpose built logic.

Methodology

Figure 3:
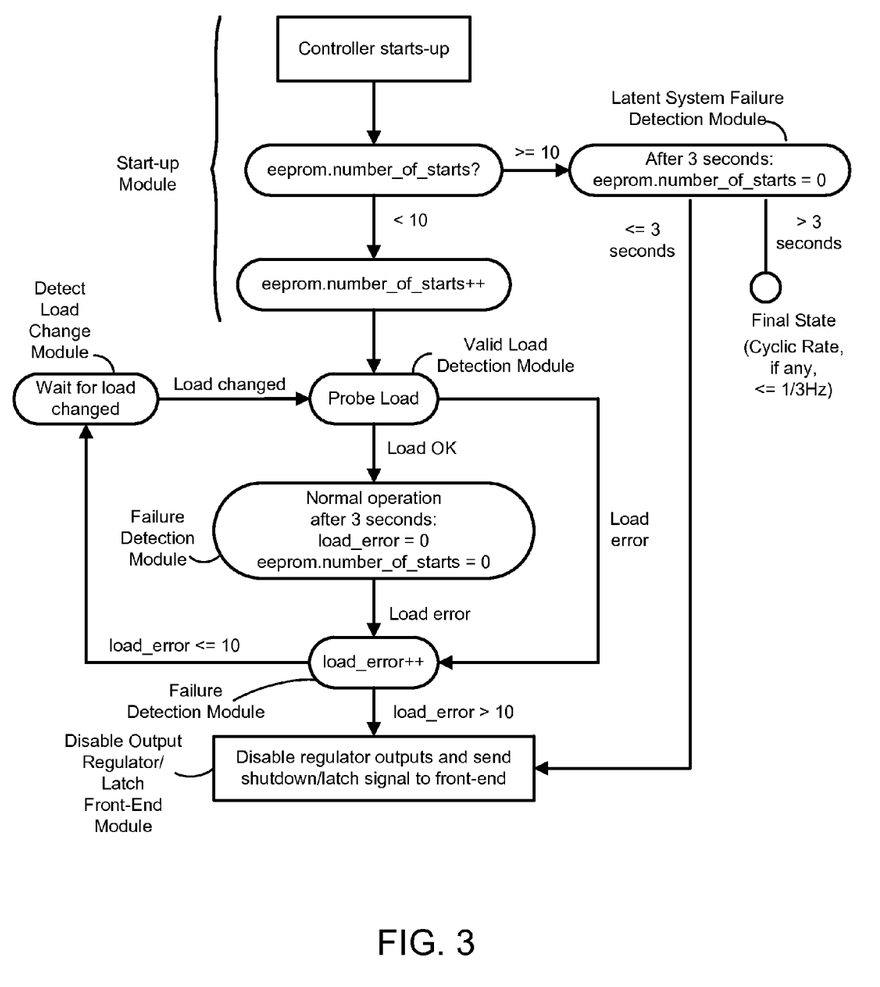
FIG. 3 illustrates a methodology for inhibiting cyclic light output caused by system faults in lighting systems according to embodiments disclosed herein.

FIG. 3 illustrates a method for inhibiting cyclic light output caused by system faults in lighting systems. The method may be, and in some embodiments is, carried out, for example, by the microcontroller 105 configured as shown in FIG. 2. However, numerous other configurations may be used without departing from the scope of the invention. For ease of description, a microcontroller configured in the same way as the microcontroller 105 of FIG. 2 is referred to as carrying out the functionality of the method shown in FIG. 3.

As explained above in regards to FIG. 2, in some embodiments two counters are used to memorize the number of failed start-up attempts of a power supply system, such as but not limited to the power supply system 100 of FIG. 1, to which a load, such as but not limited to the load 109 of FIG. 1, is connected. One counter stores information in non-volatile memory (e.g., ROM or flash memory), so that it is not lost even if the microcontroller loses power. The other counter stores information in volatile (e.g., RAM) memory, which may provide faster access. When the microcontroller starts up, the method commences with checking whether the non-volatile error counter holds a number greater than a given threshold (e.g., is eeprom.number_of_starts>=10). If so, then the method does not power-up the load right away. Rather, it waits for a certain time, such as but not limited to 3 seconds and/or substantially 3 seconds, before resetting the non-volatile counter (e.g., eeprom.number_of_starts=0). As previously explained, the time delay before resetting the counter is introduced to address fault modes where a failure lets the microcontroller repetitively lose power within the first few seconds after start up. Eventually, the power supply system halts in a final state. Here, the method includes disabling any outputs of the output regulator stage and may further include sending a shutdown/latch signal to the front end of the power supply system. This disabled/latched state persists until the input power is cycled (switched-off and on again), and then the process repeats, but without any rapid cycling.

As is further seen, the non-volatile counter is incremented every start up (e.g., eeprom.number_of_starts++). After the non-volatile counter has reached its threshold, it is reset only when the microcontroller has stable power for a minimum time, such as but not limited to 3 seconds and/or substantially 3 seconds. Thus, the non-volatile counter will not be reset if a fault mode does not let the power supply system operate stably for at least that minimum time (i.e., 3 seconds). The worst case scenario would be a failure that occurs repetitively after about 4 seconds. In such a scenario, the output cycling is limited to a frequency of less than ⅓ Hz. Other delays may be used to ensure even slower cycling if so desired. Thus, in some embodiments, the delay variables (such as the Delays M and N) are user-configurable.

Figure 4A:
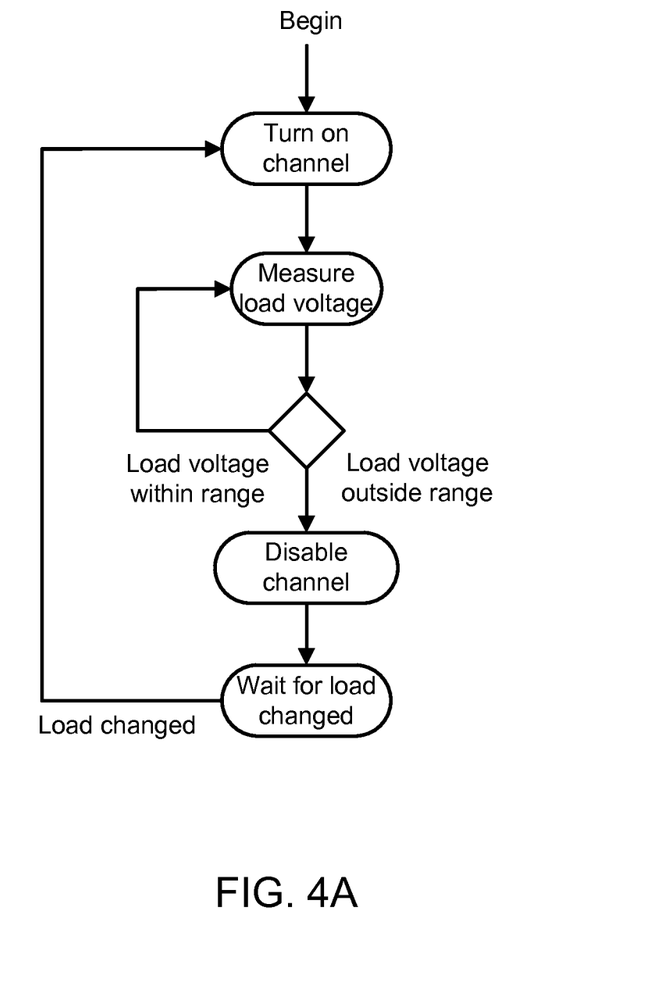
FIGS. 4A and 4B each illustrate a methodology for probing a load such as a lighting system that may be used in the methodology of FIG. 3 according to embodiments disclosed herein.
Figure 4B:
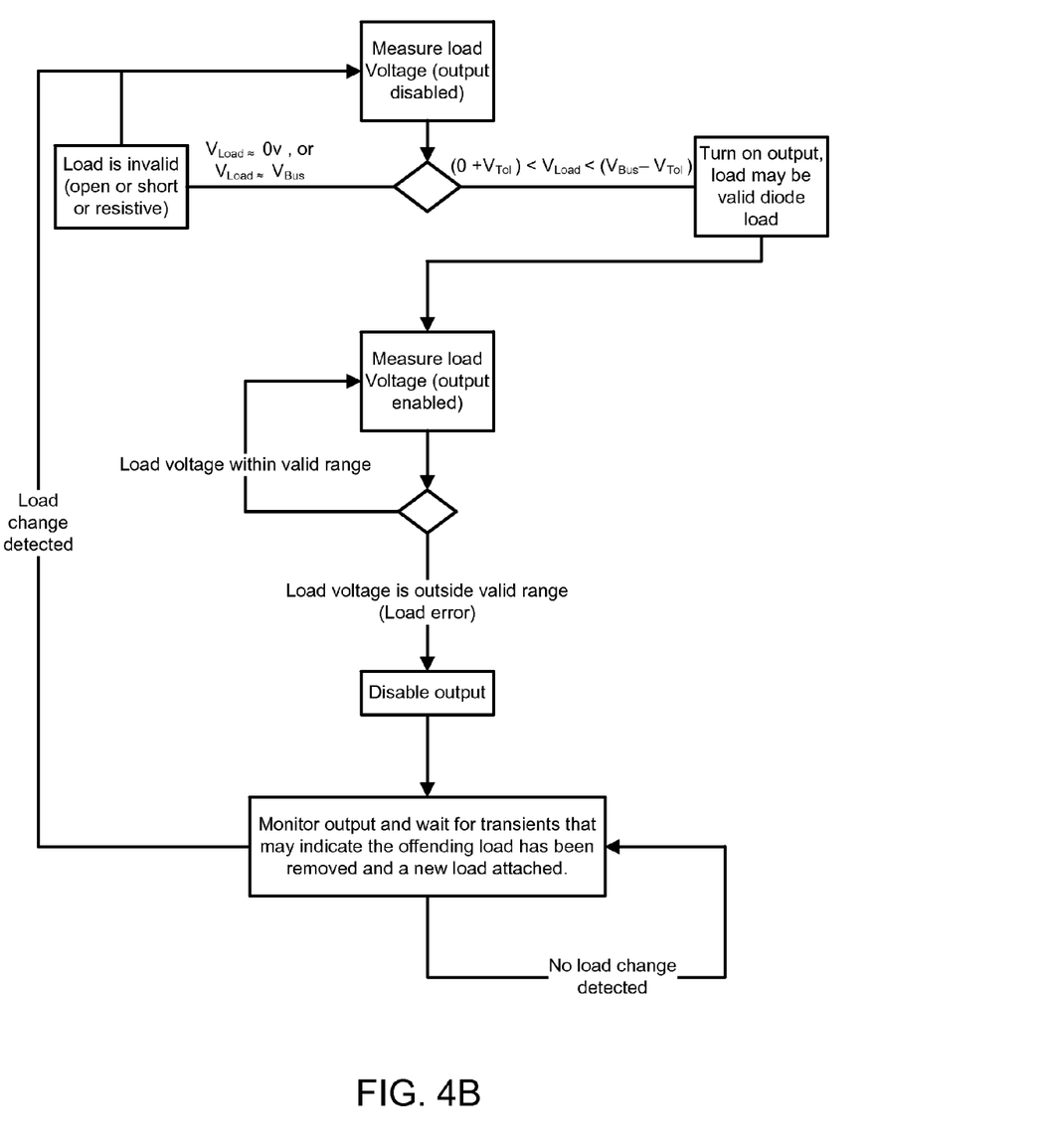

Once the non-volatile counter is incremented, the method continues with checking whether the connected load is a valid load. FIGS. 4A-B each illustrate a method for checking whether the connected load is valid, and each will be discussed in turn. If the connected load is valid, the method continues with normal power supply system operation and further includes resetting each of the volatile and non-volatile counters after a suitable delay (e.g., 3 seconds) of uninterrupted operation. Thus, if the power supply system stays in operation for at least 3 seconds, then the load error and eeprom.number_of_starts counters are both set to 0. On any error, the method includes incrementing the volatile counter (e.g., load error++). If the volatile counter is greater than the given threshold (e.g., is load error>10), then the method includes going into a halt mode and waiting there until the input power is cycled. A disable command may be, and in some embodiments is, sent to the output regulator stage and/or a latch command may be, and in some embodiments is, sent to the front end to prevent power from being applied to the load, as explained throughout.

Otherwise, the method continues with waiting for the error condition to go away (e.g., wait for a load changed condition), assuming the load caused the error. Waiting for the load to change may prevent the power supply system from cycling. Where the power supply system does not reliably wait at the wait for load changed state, the volatile counter (e.g., load error) ensures that the processing loop including probe load, normal operation, load error++, and waiting for load changed is cycled at a maximum of, for example, 10 times, before it is interrupted (e.g., load error>10) and halted. Again, a disable command may be sent to the output regulator stage and/or a latch command may be sent to the front end to prevent power from being applied to the load.

Load Detection

FIG. 4A shows a method for probing a load, such as but not limited to the light source load 109. The method shown in FIG. 4A assumes a multi-channel power supply, where each channel drives a separate load, though embodiments are not so limited. Thus, some embodiments include using the method in connection with a single output power supply. The method includes allowing a small amount of current flowing through the load to allow for sensing characteristics of the load without enabling the output driver (e.g., a current in the microamp to milliamp range, or a current that is a percentage of the overall current capacity such as 10% or smaller, or otherwise sufficient to make desired measurements but not necessarily sufficient to noticeably turn on one or more light sources in the load). This small test current flow could be, for example, present all the time, or selectively enabled and disabled by the microcontroller 105. For instance, this relatively low test current could continuously flow, for example, through a high impedance path from the DC voltage bus to the load to ground. Alternatively, this path could also be switched open or closed by the microcontroller 105 to enable/disable. Note that such circuitry to facilitate application of the test current may be implemented independently of the output regulator stage 107, and that the output regulator stage output may be disabled during any such testing, and the test current appears as an almost undetectable leakage current through the load.

The method begins with turning on a given channel and measuring the load voltage. Then a determination is made as to whether the load voltage is within a given range. If so, then the channel remains enabled so the power supply continues to run, and monitoring of the load voltage continues. If, on the other hand, the load voltage is not within the given range, then the method continues with disabling the output and/or channel, and waiting for the load to be changed. Thus, whenever an incorrect load has been detected, the power supply is assumed to be in a failure state, and the output of the power supply is disabled (e.g., the microcontroller 105 issues a disable signal to the output regulator stage 107). Once disabled, a valid load must be connected for the power supply to enter normal operation. There are a number of ways to determine if the load has been changed. In some embodiments, the power supply will continually monitor the load return voltage but will not re-enable the output until the following two conditions have been met: (1) a rapid positive slope is detected on the return voltage line; and (2) the return voltage settles at a voltage less than the bus voltage. These two conditions may be readily detected, for example, by the Detect Load Change Module of the microcontroller 105 and are indicative that a new load has been connected to the power supply and may further indicate that the new load is not a short circuit (or a circuit that otherwise appears as an improper resistance). Once these two conditions have been met, normal operation may be resumed and the monitoring process continues. In a more general sense, the Detect Load Change Module may be programmed or otherwise configured to detect an open-circuit (e.g., $V_{Load}=V_{Bus}$), a short-circuit (e.g., $V_{Load}=0$ v), or a rapid slope (positive or negative) on the main or return voltage lines followed by a settled voltage across the main/return lines may be used to indicate a load change. As previously indicated, an output element across the main/return lines (e.g., a capacitor) may be monitored to detect such changes, or the main and/or return lines may be directly monitored, for example. As also previously explained, fail codes may also be used in assessing whether a load has been changed. In any such scenarios, the output may be monitored for transients or other indicia that may indicate the offending load has been removed and a new load attached. If the new load is or otherwise becomes invalid, the power supply will detect that (e.g., because the load voltage is too low when compared to a preset reference voltage or otherwise out of the specified range) and the power supply will re-enter the failure mode and the output/channel will be disabled until a new load is applied, and so on.

FIG. 4B illustrates a method for probing a load such as a light source load 109. Like the method of FIG. 4A, this method may be implemented independently or in conjunction with other functionalities, and may be applied to a multichannel power supply or a power supply with one output, and the claimed invention is not intended to be limited to any particular configuration particular application. FIG. 4B assumes a multichannel power supply. This method is similar to that depicted in FIG. 4A, except that initial load measurements are made with the channel/output disabled. In addition, the method shown in FIG. 4B further allows for detection of improper resistive loads. The method also includes allowing a small amount of test current flowing through the load in order to detect changes (e.g., 50 microamps to 500 milliamps), as previously explained with reference to FIG. 4A.

As can be seen, the method includes measuring the load voltage ($V_{Load}$) with the channel disabled (with only small test current flowing that is sufficient to allow for measurements), and then making a determination depending in the measured value. In particular, if the load voltage $V_{Load}$ is close or equal to the bus voltage $V_{Bus}$ (e.g., open-circuit), the output remains disabled. If the load voltage $V_{Load}$ is close or equal to zero volts (e.g., short circuit or improper resistive load), the output remains disabled. Note that a voltage tolerance ($V_{Tol}$) can be established so as to provide a range offending voltage levels, such as if $V_{Load}=0$ volts$+/-100$ millivolts, then assume short circuit or improper resistive load; likewise, if $V_{Load}=V_{Bus}+/-100$ millivolts, then assume open circuit. Variations on these initial assessments will be apparent in light of this disclosure, such as will be discussed with respect to the example embodiments of FIGS. 4A-4B.

Otherwise, the load may be a valid diode load and the output is therefore enabled and immediately monitored. For instance, when: $(0+V_{Tol})<V_{Load}<(V_{Bus}-V_{Tol})$, then allow testing of output at full output current. If the load voltage $V_{Load}$ stays in the valid operating range with full output current, the methodology allows the power supply to continue to operate. However, if at any time the load voltage $V_{Load}$ falls outside the valid range, the method continues with disabling the output. Once a load is detected as invalid, the power supply will monitor the load voltage and look for the old load to be disconnected (e.g., leaving open-circuit conditions), and wait for a new load to be attached. Thus, the method continues with monitoring the output for transients or other indicia that may indicate the offending load has been removed and a new load attached. If not, the method continues to monitor for a load change. When a new load is attached the process can be repeated.

The methods and systems described herein are not limited to a particular hardware or software configuration, and may find applicability in many computing or processing environments. The methods and systems may be implemented in hardware or software, or a combination of hardware and software. The methods and systems may be implemented in one or more computer programs, where a computer program may be understood to include one or more processor executable instructions. The computer program(s) may execute on one or more programmable processors, and may be stored on one or more storage medium readable by the processor (including volatile and non-volatile memory and/or storage elements), one or more input devices, and/or one or more output devices. The processor thus may access one or more input devices to obtain input data, and may access one or more output devices to communicate output data. The input and/or output devices may include one or more of the following: Random Access Memory (RAM), Redundant Array of Independent Disks (RAID), floppy drive, CD, DVD, magnetic disk, internal hard drive, external hard drive, memory stick, or other storage device capable of being accessed by a processor as provided herein, where such aforementioned examples are not exhaustive, and are for illustration and not limitation.

The computer program(s) may be implemented using one or more high level procedural or object-oriented programming languages to communicate with a computer system; however, the program(s) may be implemented in assembly or machine language, if desired. The language may be compiled or interpreted.

As provided herein, the processor(s) may thus be embedded in one or more devices that may be operated independently or together in a networked environment, where the network may include, for example, a Local Area Network (LAN), wide area network (WAN), and/or may include an intranet and/or the internet and/or another network. The network(s) may be wired or wireless or a combination thereof and may use one or more communications protocols to facilitate communications between the different processors. The processors may be configured for distributed processing and may utilize, in some embodiments, a client-server model as needed. Accordingly, the methods and systems may utilize multiple processors and/or processor devices, and the processor instructions may be divided amongst such single- or multiple-processor/devices.

The device(s) or computer systems that integrate with the processor(s) may include, for example, a personal computer (s), workstation(s) (e.g., Sun, HP), personal digital assistant (s) (PDA(s)), handheld device(s) such as cellular telephone(s) or smart cellphone(s), laptop(s), handheld computer(s), or another device(s) capable of being integrated with a processor (s) that may operate as provided herein. Accordingly, the devices provided herein are not exhaustive and are provided for illustration and not limitation.

References to "a microprocessor" and "a processor", or the "microprocessor" and the "processor," may be understood to include one or more microprocessors that may communicate in a stand-alone and/or a distributed environment(s), and may thus be configured to communicate via wired or wireless communications with other processors, where such one or more processor may be configured to operate on one or more processor-controlled devices that may be similar or different devices. Use of such "microprocessor" or "processor" terminology may thus also be understood to include a central processing unit, an arithmetic logic unit, an application-specific integrated circuit (IC), and/or a task engine, with such examples provided for illustration and not limitation.

Furthermore, references to memory, unless otherwise specified, may include one or more processor-readable and accessible memory elements and/or components that may be internal to the processor-controlled device, external to the processor-controlled device, and/or may be accessed via a wired or wireless network using a variety of communications protocols, and unless otherwise specified, may be arranged to include a combination of external and internal memory devices, where such memory may be contiguous and/or partitioned based on the application. Accordingly, references to a database may be understood to include one or more memory associations, where such references may include commercially available database products (e.g., SQL, Informix, Oracle) and also proprietary databases, and may also include other structures for associating memory such as links, queues, graphs, trees, with such structures provided for illustration and not limitation.

References to a network, unless provided otherwise, may include one or more intranets and/or the internet. References herein to microprocessor instructions or microprocessor-executable instructions, in accordance with the above, may be understood to include programmable hardware.

Unless otherwise stated, use of the word "substantially" may be construed to include a precise relationship, condition, arrangement, orientation, and/or other characteristic, and deviations thereof as understood by one of ordinary skill in the art, to the extent that such deviations do not materially affect the disclosed methods and systems.

Throughout the entirety of the present disclosure, use of the articles "a" and/or an and/or the to modify a noun may be understood to be used for convenience and to include one, or more than one, of the modified noun, unless otherwise specifically stated. The terms "comprising", "including" and "having" are intended to be inclusive and mean that there may be additional elements other than the listed elements.

Elements, components, modules, and/or parts thereof that are described and/or otherwise portrayed through the figures to communicate with, be associated with, and/or be based on, something else, may be understood to so communicate, be associated with, and or be based on in a direct and/or indirect manner, unless otherwise stipulated herein.

Although the methods and systems have been described relative to a specific embodiment thereof, they are not so limited. Obviously many modifications and variations may become apparent in light of the above teachings. Many additional changes in the details, materials, and arrangement of parts, herein described and illustrated, may be made by those skilled in the art.

What is claimed is:

1. A method comprising:
   upon start-up of a power supply, determining whether a non-volatile counter is greater than a threshold (X), wherein the non-volatile counter tracks failed startup attempts of the power supply; and
   in response to determining that the non-volatile counter is greater than the threshold (X):
     delaying application of the power supply to a light source load connected thereto for a delay (N);
     in response to the power supply not shutting down prior to the delay (N) passing, resetting the non-volatile counter; and
     in response to the power supply shutting down prior to the delay (N) passing, preventing power from being applied to the light source load to inhibit strobing of the light source load.

2. The method of claim 1, wherein in response to determining that the non-volatile counter is not greater than the threshold (X), the method further comprises determining whether the light source load is a valid load.

3. The method of claim 2, wherein in response to determining that the non-volatile counter is not greater than the threshold (X), the method further comprises incrementing the non-volatile counter.

4. The method of claim 2, wherein in response to determining that the light source load is a valid load, the method further comprises delaying application of the power supply to the light source load for a delay (M).

5. The method of claim 4, wherein in response to the power supply not shutting down prior to the delay (M) passing, the method further comprises resetting a volatile counter, wherein the volatile counter tracks failed startup attempts of the power supply.

6. The method of claim 5, further comprising incrementing the volatile counter for a detected load error.

7. The method of claim 6, wherein in response to determining that the volatile counter is greater than a threshold (Y), the method further comprises at least one of:
   disabling an output regulator stage of the power supply from providing power to the load; and
   latching an input conversion stage of the power supply including galvanic isolation.

8. The method of claim 6, wherein in response to determining that the volatile counter is not greater than a threshold (Y), the method further comprises waiting for the detected load error to pass.

9. A non-transitory computer readable medium encoded with instructions that, when executed by one or more processors, cause a power supply to power a light source load, by performing operations of:

upon start-up of the power supply, determining whether a non-volatile counter is greater than a threshold (X), wherein the non-volatile counter tracks failed startup attempts of the power supply; and in response to determining that the non-volatile counter is greater than the threshold (X):

delaying application of the power supply to the light source load for a delay (N);

in response to the power supply not shutting down prior to the delay (N) passing, resetting the non-volatile counter; and in response to the power supply shutting down prior to the delay (N) passing, preventing power from being applied to the light source load.

10. The non-transitory computer readable medium of claim 9, wherein in response to determining that the non-volatile counter is not greater than the threshold (X), the processor performs further operations of determining whether the light source load is a valid load.

11. The computer readable medium of claim 10, wherein in response to determining that the non-volatile counter is not greater than the threshold (X), the processor performs further operations of incrementing the non-volatile counter.

12. The computer readable medium of claim 10, wherein in response to determining that the load is a valid load, the processor performs further operations of delaying application of the power supply to the light source load for a delay (M).

13. The computer readable medium of claim 12, wherein in response to the power supply not shutting down prior to the delay (M) passing, the processor performs further operations of resetting a volatile counter, wherein the volatile counter tracks failed startup attempts of the power supply.

14. The computer readable medium of claim 13, wherein the processor performs further operations of incrementing the volatile counter for a detected load error.

15. The computer readable medium of claim 14, wherein in response to determining that the volatile counter is greater than a threshold (Y), the processor performs further operations of at least one of:

disabling an output regulator stage of the power supply from providing power to the light source load; and latching an input conversion stage of the power supply including galvanic isolation.

16. The computer readable medium of claim 14, wherein in response to determining that the volatile counter is not greater than a threshold (Y), the processor performs further operations of waiting for the detected load error to pass.

17. A system to power a light source load with a power supply, comprising:

an input conversion stage configured to convert a first voltage source to a second voltage source;

an output regulator stage configured to receive the second voltage source and to provide a power source to drive the light source load; and a controller having a processor and a memory with instructions encoded thereon that, when executed by the processor, cause the system to:

upon start-up of the power supply, determine whether a non-volatile counter is greater than a threshold (X), wherein the non-volatile counter tracks failed startup attempts of the power supply; and in response to the determining that the non-volatile counter is greater than the threshold (X):

delay application of the power supply to the light source load for a delay (N);

in response to the power supply not shutting down prior to the delay (N) passing, reset the non-volatile counter; and in response to the power supply shutting down prior to the delay (N) passing, prevent power from being applied to the light source load to inhibit strobing.

18. The system of claim 17, wherein:

in response to determining that the non-volatile counter is not greater than the threshold (X), the system is further configured to determine whether the light source load is a valid load and to increment the non-volatile counter;

in response to determining that the light source load is a valid load, the system is further configured to delay application of the power supply to the light source load for a delay (M); and in response to the power supply not shutting down prior to the delay (M) passing, the system is further configured to reset a volatile counter, wherein the volatile counter tracks failed startup attempts of the power supply.

19. The system of claim 18, wherein:

the system is further configured to increment the volatile counter for a detected load error; and in response to determining that the volatile counter is greater than a threshold (Y), the system is further configured to at least one of:

disable the output regulator stage of the power supply from providing power to the light source load; and latch the input conversion stage of the power supply including galvanic isolation.

20. The system of claim 19, wherein in response to determining that the volatile counter is not greater than a threshold (Y), the system is further configured to wait for the detected load error to pass.

* * * * *